Dec. 8, 1953  C. A. NORGREN ET AL  2,661,814
AIR LINE LUBRICATOR
Filed July 14, 1949  2 Sheets-Sheet 1

INVENTORS
CARL A. NORGREN,
KENNETH C. MOSIER
R. DONALD BOWDEY &
NORMAN A. METZGER
BY

*N. A. McGrew*
ATTORNEY

Dec. 8, 1953   C. A. NORGREN ET AL   2,661,814
AIR LINE LUBRICATOR
Filed July 14, 1949   2 Sheets-Sheet 2

INVENTORS
CARL A. NORGREN,
KENNETH C. MOSIER
R. DONALD BOWDEY &
NORMAN A. METZGER
BY
ATTORNEY

Patented Dec. 8, 1953

2,661,814

UNITED STATES PATENT OFFICE 2,661,814

AIR LINE LUBRICATOR

Carl A. Norgren, Westwood, Kenneth C. Mosier, Denver, R. Donald Bowdey, Lakewood, and Norman A. Metzger, Denver, Colo., assignors to C. A. Norgren Co., Denver, Colo., a corporation of Colorado Application July 14, 1949, Serial No. 104,626

10 Claims. (Cl. 184—55)

Our invention is directed to air line lubricators of the type adapted to discharge a fog of oil into an air stream, and refers more particularly to lubricators which introduce a controlled quantity of oil into an air stream only during such periods of time as air under pressure is flowing through the lubricator.

Conventional air line lubricators are frequently unsatisfactory when employed for lubricating a compressed air tool or similar mechanism, which requires air under pressure only intermittently, and then only for short periods, since under such conditions the flow of air through the lubricator is frequently of such short duration that the oil or other lubricant can not be drawn into the air stream from the lubricator reservoir, thus forcing the tool to operate without lubrication. Even under more favorable air flow conditions, the prior art lubricators may fail to deliver a constant supply of oil, primarily because the supply of oil is conventionally regulated by adjustment of a needle valve. The objectionable variation in the rate of oil discharge is most noticeable when a lubricator is adjusted to feed only a few drops of oil per minute, or even one drop in several minutes, since this requires an almost complete closing of the needle valve. Even when carefully initially regulated, the flow of lubricant under such circumstances will be gradually reduced, due at least in part to small particles of solids or semi-solids lodging in the narrow valve aperture. Other undesirable characteristics of the prior art devices are the necessity for reducing the inlet pressure to atmospheric before the supply of lubricant in the reservoir can be replenished, and the necessity for passing air through these lubricators in one direction only.

A primary object of our invention is to provide an air line lubricator which will consistently discharge into air flowing through the lubricator a predetermined quantity of lubricant, which will maintain a predetermined rate of lubricant delivery over long periods of time, even under varying and adverse air flow conditions, and which permits accurate adjustment of the rate of lubricant flow without requiring the use of very small lubricant metering orifices.

Other important objects include the provision of an air line lubricator which is simple, durable, and economical, which may be filled with lubricant while air under pressure is flowing in the lubricator, and which is reversible with respect to the air flow through the lubricator.

Further objects, as well as the many advantages of our invention will be disclosed in the course of the following detailed description of our invention, and in the appended drawings, in which.

Figure 3:
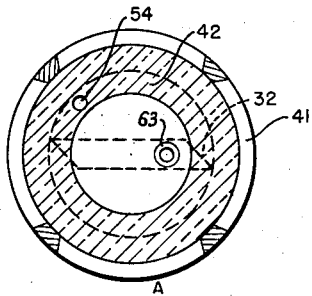
Fig. 3 is a cross section of a portion of our lubricator taken along the line 3—3 of Fig. 1.
Figure 4:
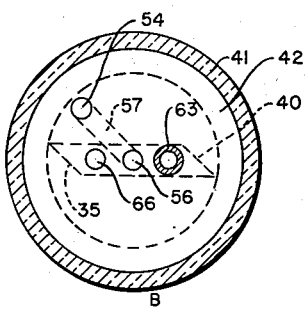
Fig. 4 is a cross section taken along the line 4—4 of Fig. 1.
Figure 5:
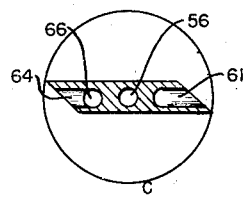
Fig. 5 is a cross section taken along the line 5—5 of Fig. 1.

In brief, our lubricator includes a body having an air passage therein to which inlet and outlet air pipes may be attached, and a depending lubricant bowl sealed to the body transversely. Extending through the body and air passage is a generally vertical rotatable lubricant metering assembly having a centrally disposed passageway through which lubricant is conveyed from the reservoir through a check valve and a needle valve into a discharge conduit. The portion of the metering assembly disposed in the air passage is generally shaped as a blade, and may for example, have a rectangular or quadrilateral cross section. An air inlet is provided on the upstream edge of the blade through which air at inlet pressure is conveyed past a check valve which is held open by a filling opening plug, into the lubricant reservoir. The opposite, or downstream, edge of the blade has a lubricant discharge opening or port through which oil from the needle valve is drawn into the air stream, where it is atomized into a fog or suspension.

The blade in the air passageway restricts the area available therein for air flow, and thus increases the velocity of air flowing past the blade. This in turn develops a relatively low pressure on the downstream edge of the blade around the discharge opening, and thus creates a pressure differential which is sufficient to draw oil from the reservoir to the discharge opening. Since the flow of oil will be proportionate to the pressure differential established between the air inlet and oil discharge openings in the blade, it may be seen that the rate of oil flow may be increased by increasing the velocity of the air flowing past the blade. This is attained by rotating the metering assembly or blade, which is an integral part of the metering assembly, to a diagonal position in which the blade extends diagonally across the air stream, thus further restricting the cross sectional area in the conduit through which the air must pass.

To adjust our lubricator to a very low rate of delivery, the needle valve is opened wide and the metering assembly with the blade turned to a diagonal position across the air conduit to create a relatively high pressure differential between the air inlet and the oil discharge openings in the blade, thus creating a flow of oil through the needle valve. The metering assembly is then rotated in a direction which reduces both the pressure differential and the oil flow until the latter is slightly in excess of the desired quantity. The opening of the needle valve is then reduced to obtain the exact flow required. The rotatable metering assembly may therefore be considered as constituting the coarse or primary adjustment and the needle valve as the fine or vernier adjustment.

When so adjusted, it will be found that the needle valve is not in a practically closed condition as would be the case in conventional lubricators adjusted to a very low oil flow rate, and as a result the tendency towards clogging of the valve is practically eliminated. Furthermore, the check valve in the passage leading to the needle valve prevents the reverse flow lubricant therein and allows an immediate discharge of lubricant wherever there is even a momentary flow of air past the lubricator.

Figure 1:
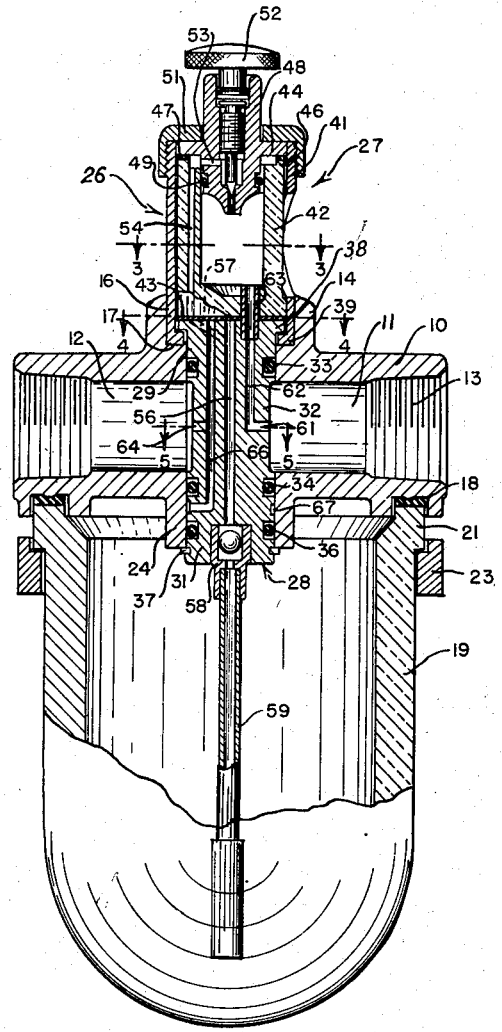
Fig. 1 is a partial cross section through a preferred embodiment of our lubricator.
Figure 2:
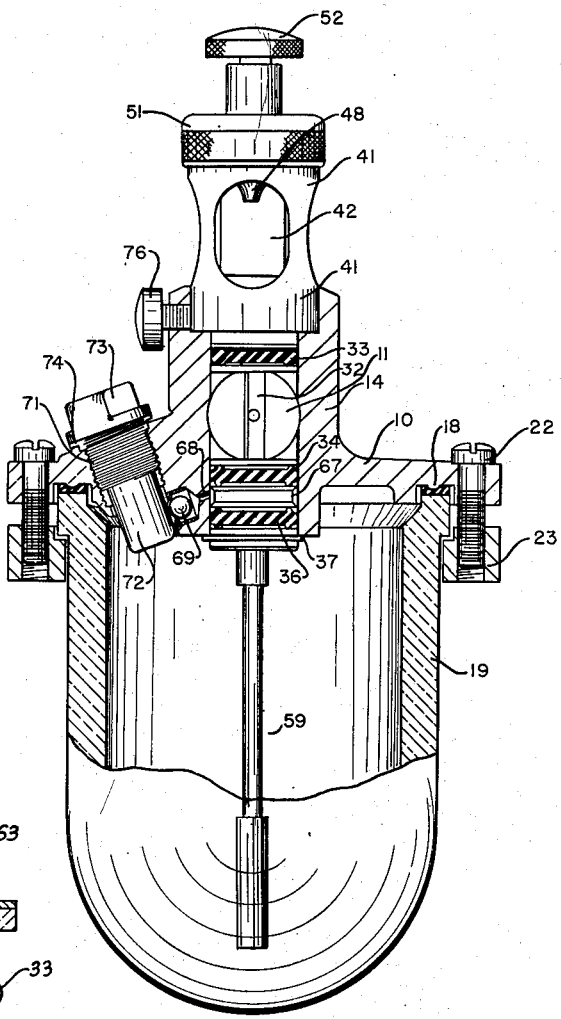
Fig. 2 is a partial cross section through our lubricator taken at 90° to Fig. 1.
Figure 6:
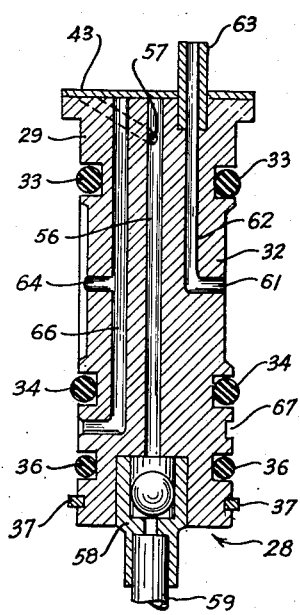
Fig. 6 is an enlarged cross sectional view of the lower portion of our metering assembly.

Our preferred form of lubricator is illustrated in Figs. 1 and 2, and includes a body 10, usually of forged brass or the like, in which is formed a cylindrical air conduit 11 having a threaded inlet 12 and a threaded outlet 13. A boss 14 extends upwardly from the body immediately above the air passageway 11 and has a downwardly extending counter bore 16 forming a shoulder 17. The lower surface of the body 10 is grooved to receive a peripheral gasket 18. A bowl 19 having a lip flange 21 engages the gasket 18 and is held in position by bolts 22 extending through the body 10 into engagement with a circumferential ring 23, which engages the lip flange 21. A circular bore extends through the central portion of the body 10 and boss 14 on the axis of the passageway 11 and through a depending boss 24 formed on the lower surface of the body 10. In this bore we mount a metering assembly, generally designated 26, conveniently formed from a rod and including an upper cylindrical section 29 and a lower cylindrical section 31. Although the cross section of the blade 32 may be rectangular in form, better results will often be obtained by beveling the upstream edge 35 and the downstream edge 40 of the blade 32 in such manner that the cross section of the blade 32 is approximately a parallelogram, it being understood that the sides and edges of the blade need not necessarily be straight. Changing the shape of the sides of the blade 32, or more particularly the shape or degree of bend of the edges, varies the pressure reduction obtained per degree of blade rotation between the air inlet and oil discharge openings, and therefore permits control of the metering characteristics of the lubricator.

The upper cylindrical section 29 is grooved to receive a resilient sealing ring 33, which seals the central opening against loss of air. The lower cylindrical section 31 is provided with spaced grooves in which sealing rings 34 and 36 are mounted. The portion of the lower cylindrical section extending downwardly beyond the boss 34 is also grooved to receive a snap ring 37, which holds the metering assembly 26 in position.

The upper cylindrical section 29 is provided with a laterally extending head 38, which is engaged on its under surface by lips 39 formed on the lower extremity of a sight gauge guard 41, the latter being provided with apertures extending through its wall to permit observation of the rate of oil flow. A transparent cylindrical sight gauge 42 rests on a gasket 43 interposed between the base of the sight gauge 42 and the head 38. The upper extremity of the sight gauge 42 is counterbored as at 44, forming lips 46 which support a ring gasket 47. A needle valve body 48 rests on the gasket 47 and projects a short distance downwardly within the sight gauge 42, the joint between the valve 48 and the sight gauge being sealed by a resilient ring 49. A cover 51 engages the upper surface of the needle valve body 48 and is threaded to the sight gauge cover 41, the lips 39 of which engage the shoulder 17. The valve body 48 has threaded therein an adjusting screw 52 disposed to open and close a valve seat in the lower portion of the valve body 48. A short passageway 53 connects the interior of the valve body with the space formed by the counterbore 44, which in turn communicates with a bore 54 formed in the sight gauge 42. The lower portion 28 of the metering assembly 26 has an axial bore 56 blocked at its upper end by the gasket 43. A diagonal bore 57 connects the bore 56 with the bore 54, a suitable opening being provided in the gasket 43 for this purpose.

A check valve 58 is mounted in the lower portion 28 in position to block downward flow of lubricant through the bore 56 and communicates with a tube 59, which extends downwardly from the check valve 58 into the bowl 19. The blade 32 has a discharge opening 61 formed in its down stream edge and is supplied with lubricant through a bore 62 formed in the blade 32 extending upwardly into communication with a tube 63, the latter extending through the gasket 43 and communicating with the interior of the sight gauge 42. The upstream edge of the blade 32 is provided with an air inlet opening 64 which communicates with a bore 66 in the blade 32, having an outlet in a peripheral groove 67 formed in the lower portion 28 of the metering assembly 26 between the rings 34 and 36. A passageway 68 is formed in the body 10 connecting the groove 67 with a check valve 69, which may be urged by gravity or a suitable spring into a position preventing a flow of air through the passageway 68 into the bowl 19. The body 10 is provided with a threaded filler plug opening in which a filler plug 71 having a nose 72 and a head 73 may be secured. The plug 71 is positioned in such manner that the nose 72 holds the check valve 69 in an unseated position and thus permits the flow of air from the air inlet 64 through the passageway 68 into the bowl 19 when the plug 71 is secured in position. A gasket 74 is interposed between the head 73 and the body 10 to prevent leakage.

Mounted in the boss 14 is a set screw 76, the inner end of which engages the sight gauge guard 41 and prevents accidental rotation of the metering assembly 26. Preferably the exterior surface of the cover 51 is knurled for convenient rotation of the metering assembly 26 when the set screw is loosened.

In operation, suitable air lines are connected to the inlet and outlet 12 and 13 of my lubricator, and the bowl 19 is filled with lubricant through the filler plug 71. After fully opening the needle valve 48, the set screw 76 is loosened and the metering assembly 26 turned in such manner as to restrict the flow of air around the blade 32, and with the air inlet 64 positioned in an upstream direction. Air under inlet pressure will enter the air inlet opening 64 and pass through the bore 66 into the groove 67, thence through the passageway 68 and the check valve 69, which is held in open position by the nose 72 of the filler plug 71, into the bowl 19, placing the lubricant therein at inlet pressure. The pressure conditions existing around the oil discharge opening 61 will be below inlet pressure, due to the increased velocity of air flow around the blade 32, this effect being greatly increased by disposing the blade at an angular position with respect to the direction of air flow. As a result, this lower pressure will be communicated to the interior of the sight gauge 42, thence through the bore 54 and the bore 56 to the tube 59, which is immersed in lubricant. This establishes a pressure differential sufficient to draw oil from the bowl 19 upwardly through the tube 59, past the check valve 58, through the bores 56, 57, and 54, into the counter bore 44, from which it passes through the passageway 53, through the open needle valve 48 into the sight gauge 42, and downwardly through the tube 63 and the bore 62 to the discharge opening 61, where it is atomized by the turbulence of the air stream.

Since the pressure differential under the above-defined conditions will be quite high, a relatively rapid flow of oil will be observed through the sight gauge 42. The metering assembly 26 is then turned in a reverse direction to reduce the flow of oil to an approximate number of drops per minute somewhat in excess of the amount actually desired. At this point the set screw 76 is tightened to retain the assembly in position. The rate of oil flow is then further reduced by partially closing the needle valve 48 until the desired rate of flow is attained. The rate of flow thus established will be maintained almost indefinitely, and the only attention required will be an occasional addition of lubricant to the bowl.

The shape of the blade 32 and the blade edges 35 and 40 are of considerable importance, since the increase in air velocity, and hence the pressure differential, created by the angular movement of the blade 32 becomes relatively greater per degree of rotation as the blade is turned towards a position in which it substantially blocks the passage 11. By beveling or otherwise shaping the upstream and downstream edges 35 and 40 of the blade 32, this effect is considerably reduced and may be made to approach a uniform function wherein the increase in velocity of the air and therefore the pressure differential is proportionate to the angular displacement of the blade 32 from a position in which its major plane is parallel to the direction of air flow.

The bowl 19 may be filled with lubricant even while air under pressure is flowing through the passageway, since by removing the plug 71 the check valve 69 is allowed to seat and prevents the flow of air under inlet pressure through the passageway 68. The air under pressure in the bowl 19 escapes around the plug 71 as the plug is being withdrawn and is reestablished after the plug 71 has been resecured in position.

It will be found that even a momentary flow of air through my lubricator will cause the discharge of lubricant from the lubricant discharge opening 61 because the check valve 58 prevents the downward flow of lubricant. Only a very slight period of time is required to draw lubricant from the valuve 48, the amount withdrawn being immediately replenished from the reservoir 19 through the tube 59.

From the foregoing it may be seen that we may attain, when desired, a very slow rate of oil flow without adjusting the needle valve to a position in which it is practically closed. As a result, there is practically no tendency for the valve to plug, and thus alter the rate at which oil is discharged into the air stream. Furthermore, since we attain a high degree of control over the pressure differential which creates the flow of oil through my lubricator by movement of the metering assembly 26, we can govern with a high degree of accuracy the total quantity of oil delivered to the air stream in a given period of time, regardless of whether a large or small quantity of oil is required. The quantity of oil actually delivered will be substantially uniform with respect to the total quantity of air passing the blade 32, regardless of whether or not the flow is continuous, since there is practically no lag in time between the initiation of air flow past the blade 32 and the discharge of lubricant from the opening 61. Furthermore, the direction of air flow through the lubricator can be reversed when desired without reversing the position of the lubricator, the change being accomplished simply by rotating the metering assembly 26 through 180°.

The foregoing detailed description of a preferred embodiment of our invention has been made in compliance with R. S. 4888, and is to be understood as illustrative, rather than restrictive in nature. We do not therefore limit ourselves to the precise details herein described, except as defined in the appended claims.

We claim:

1. An air line lubricator comprising a body having an air conduit formed therein for the passage of air under pressure, a lubricant reservoir sealed to the body, a metering assembly rotatably mounted in the body including a blade portion disposed in the air conduit, said blade portion having in cross section a major dimension substantially greater than a minor dimension measured normal to the major dimension, an oil conduit for conveying oil from the reservoir to an oil discharge opening in the downstream edge of the blade portion and a valve for regulating the flow of oil through the said oil conduit.

2. An air line lubricator comprising a body having an air conduit formed therein for the passage of air under pressure, a lubricant reservoir sealed to the body, a metering assembly rotatably mounted in the body including a blade portion disposed in the air conduit, said blade portion having in cross section a major dimension substantially greater than a minor dimension measured normal to the major dimension, an oil conduit for conveying oil from the reservoir to an oil discharge opening in the downstream edge of the blade portion, and an orifice for regulating the flow of oil through the said oil conduit.

3. An air line lubricator comprising a body having an air conduit for the passage of air under pressure, a lubricant reservoir sealed to the body, a blade rotatably mounted in the body in the path of air flowing through the air conduit, thereby dividing the air conduit into two restricted channels, one cross sectional dimension of the blade being greater than the other and at least substantially equal to the diameter of the air conduit, means for rotating the blade, first conduit means for passing air at inlet pressure into the reservoir, second conduit means for conveying lubricant from the reservoir to a discharge opening on the downstream edge of the blade, and a valve for regulating the flow of lubricant through the second conduit means.

4. An air line lubricator comprising a body having an air conduit, a lubricant reservoir sealed to the body, a first conduit member in the air conduit having an open end facing in the downstream direction, a lubricant conduit for carrying lubricant from the reservoir to the first conduit member, a second conduit member for passing air at inlet pressure into the reservoir, and means including a rotatable blade member extending into the air conduit for adjustably restricting the cross sectional area of the air conduit around the open end above said first conduit.

5. An air line lubricator comprising a body having an air conduit for the passage of air under pressure, a pendant lubricant container sealed to the body, said body having a conduit formed therein for the passage of air under inlet pressure into the container, a metering assembly rotatably mounted in the body including a blade portion disposed in the air conduit, conduit means including a tube on the base of the assembly and a passage in the metering assembly, a check valve in the conduit means for preventing the reverse flow of lubricant, said conduit means having a discharge opening in the downstream edge of the blade portion, and valve means between the check valve and the discharge opening for regulating the flow of lubricant through the conduit.

6. An air line lubricator comprising a body having an air conduit formed therein for the passage of air under pressure, a lubricant container sealed to the body, a lubricant conduit including a member disposed in the air conduit having an inlet in the container and an outlet in the air conduit facing in a downstream direction, conduit means for passing air under inlet pressure from the air conduit into the container, a check valve in the conduit means automatically seating for preventing passage of air into the container, and a threaded filler plug in the body having a surface engaging and unseating the check valve when said plug is in sealing position.

7. An air line lubricator comprising a body having an air conduit formed therein for the passage of air under pressure, a lubricant container sealed to the body, a lubricant conduit for conveying lubricant from the container to the air conduit including a blade disposed in the air conduit with a discharge opening facing in a downstream direction, said blade being rotatable for decreasing the unobstructed cross sectional area of the air conduit, means for passing air at inlet pressure from the air conduit into the container, and a check valve in the lubricant conduit for preventing flow of lubricant towards the container.

8. An air line lubricator comprising a body having an air conduit formed therein for the passage of air under pressure, a lubricant container sealed to the body, a rotatable metering assembly projecting through the body and air conduit into the lubricant container including a blade portion within the air conduit effective upon rotation for decreasing the unobstructed cross sectional area of the air conduit, lubricant conduit means including a passage extending through the blade portion for drawing lubricant from the container, a valve on the metering assembly having an inlet communicating with the lubricant conduit, a discharge conduit in the blade portion having an outlet on the downstream side thereof, a transparent member connecting the valve with the discharge conduit, and means for passing air at inlet pressure from the air conduit into the container.

9. An air line lubricator comprising a body having an air conduit formed therein for the passage of air under pressure, a pendant lubricant container sealed to the body, a metering assembly rotatably sealed to the body including a blade portion in the air conduit, the upstream and downstream edges of the blade portion being inclined with respect to the principal plane of the blade and having air inlet and oil discharge parts formed in the said upstream and downstream edges respectively, first conduit means communicating with the air inlet for passing air at inlet pressure from the air conduit into the container, and second conduit means including a passage in the blade portion for conveying lubricant from the container to the oil discharge port.

10. A metering assembly for use with a body having an air conduit for the passage of air under pressure and a sealed lubricant container comprising a generally cylindrical member having a blade portion intermediate its ends, means for rotatably sealing the member in the body with the blade in the air conduit, said blade having upstream and downstream edges approximately parallel to each other and at an angle to the principal plane of the blade, an air inlet port in the upstream edge of the blade, conduit means connecting the inlet port with the container, an oil discharge port in the downstream edge of the blade, a lubricant conduit in the cylindrical member for carrying oil from the container to the oil discharge port, and a valve in the lubricant conduit for governing the flow of lubricant therein.

CARL A. NORGREN.
KENNETH C. MOSIER.
R. DONALD BOWDEY.
NORMAN A. METZGER.

References Cited in the file of this patent
UNITED STATES PATENTS

| Number | Name | Date |
|---|---|---|
| 1,907,464 | Terry | May 9, 1933 |
| 2,223,700 | Norgren | Dec. 3, 1940 |
| 2,225,324 | Slater | Dec. 17, 1940 |